United States Patent
Wright et al.

(10) Patent No.: US 8,295,872 B2
(45) Date of Patent: Oct. 23, 2012

(54) POWER CONTROL METHOD

(75) Inventors: Paul Wright, Cambridge (GB); James Digby Yarlet Collier, Suffolk (GB); Andrei Barbu Popescu, Cambridge (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 354 days.

(21) Appl. No.: 12/604,004

(22) Filed: Oct. 22, 2009

(65) Prior Publication Data
US 2010/0105421 A1 Apr. 29, 2010

(30) Foreign Application Priority Data
Oct. 28, 2008 (GB) .................................. 0819789.9

(51) Int. Cl.
*H04B 7/00* (2006.01)
(52) U.S. Cl. .......... 455/522; 455/67.11; 455/68; 455/69
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | | |
|---|---|---|---|---|
| 6,002,942 A * | 12/1999 | Park | ............................... | 455/522 |
| 6,374,085 B1 * | 4/2002 | Saints et al. | ..................... | 455/69 |
| 6,963,754 B2 * | 11/2005 | Masuda et al. | ................ | 455/522 |
| 2004/0242258 A1 * | 12/2004 | Kim | ............................... | 455/522 |
| 2005/0003846 A1 * | 1/2005 | Anderson | ...................... | 455/522 |
| 2005/0094130 A1 * | 5/2005 | Han et al. | ...................... | 356/73.1 |
| 2006/0252451 A1 * | 11/2006 | Cho et al. | ....................... | 455/522 |
| 2007/0001754 A1 * | 1/2007 | Lakdawala et al. | ............ | 327/552 |
| 2007/0191046 A1 * | 8/2007 | Catreux-Erceg et al. | ...... | 455/522 |
| 2008/0080436 A1 * | 4/2008 | Sandhu et al. | ................ | 370/338 |

* cited by examiner

*Primary Examiner* — Dominic E Rego
(74) *Attorney, Agent, or Firm* — Fulbright & Jaworski L.L.P.

(57) ABSTRACT

Improved power control methods and power control systems are described wherein received RSSI values are processed to generate a power control signal which may be used by a link manager, or other element in a receiving station, to determine whether to send a power control message to the transmitting station. The method used to process the received RSSI values is dependent upon a value of the power measurement, for example, the method may involve a comparison between the value of the power measurement and a value of the power control signal. In another embodiment, the received RSSI values may be converted to power values and then smoothed using a filter.

7 Claims, 7 Drawing Sheets

POWER CONTROL METHOD

BACKGROUND

Some wireless protocols, such as Bluetooth®, include a power control mechanism which involves a receiving station signalling to the transmitting station to request that the transmitted power is increased or decreased. A determination of when such a request is required is made at the receiving station based on packets received from the transmitting station. The power control mechanism attempts to prevent the transmitted signal power from going too low, in which case the transmitted signal will not be received by the transmitting station. In addition, the power control mechanism attempts to prevent the transmitted signal power from being too high, which wastes electrical power and results in the transmitting signal interfering with others over a larger range than required.

In an existing receiving station, sampled received signal strength indication (RSSI) values are put through a discrete exponential filter which is adjusted per packet. The filter smoothes (or averages) the received values, which vary with time because the transmitting station hops between frequencies and different frequencies may suffer different losses in transmission from the transmitting station to the receiving station. The speed of the filter is slow in order to avoid falsely reducing the output value, which might trigger a request to be sent to the transmitting station, when the radios hop to a frequency which is subject to fading. Fading is a term used to describe a dramatic drop in received power around a particular frequency which is caused by destructive interference from multi-path signals.

The embodiments described below are not limited to implementations which solve any or all of the disadvantages of known methods of power control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Improved power control methods and power control systems are described. In an embodiment, the received RSSI values are processed to generate a power control signal which may be used by a link manager, or other element in a receiving station, to determine whether to send a power control message to the transmitting station. The method used to process the received RSSI values is dependent upon a value of the power measurement, for example, the method may involve a comparison between the value of the power measurement and a value of the power control signal. In another embodiment, the received RSSI values may be converted to power values and then smoothed using a filter.

A first aspect provides a method comprising: receiving a power measurement for a packet received from a remote station; processing the power measurement using a method which is dependent upon a value of the power measurement; and generating a power control signal.

This method may be a computer-implemented method.

Processing the power measurement may comprise: processing the power measurement using a method which is dependent upon a comparison between the power measurement and one of a value of the power control signal and a previously received power measurement.

Generating a power control signal may comprise: providing an output value to a link manager.

The power measurement may comprise a RSSI value.

Processing the power measurement may comprise: calculating a difference between the power measurement and a value of the power control signal; and if the difference exceeds a first threshold and a counter does not exceed a second threshold, rejecting the measurement and incrementing the counter.

Processing the power measurement may comprise: calculating a difference between the power measurement and a value of the power control signal; and if the difference exceeds a first threshold and a counter does not exceed a second threshold, clipping the measurement, incrementing the counter and inputting the measurement to a filter.

Processing the power measurement may further comprise: if the difference does not exceed the first threshold, resetting the counter and inputting the measurement to a filter; and if the difference exceeds the first threshold and the counter exceeds the second threshold, inputting the measurement to a filter.

Processing the power measurement may comprise: if the power measurement is larger than a value of the power control signal, inputting the measurement to a filter with a first time constant; and if the power measurement is not larger than a value of the power control signal, inputting the measurement to a filter with a second time constant, wherein the first time constant is larger than the second time constant.

Processing the power measurement may comprise: calculating a difference between the power measurement and a value of the power control signal; if the difference exceeds a first threshold and a counter does not exceed a second threshold, incrementing the counter and inputting the measurement to a filter with a second time constant; if the difference does not exceed the first threshold, resetting the counter and inputting the measurement to a filter with a first time constant; and if the difference exceeds the first threshold and the counter exceeds the second threshold, inputting the measurement to the filter with the first time constant, wherein the first time constant is larger than the second time constant.

Processing the power measurement may comprise: determining a measurement interval between the power measurement and a previously received power measurement; and inputting the power measurement to a filter hailing a filter response selected according to the measurement interval.

Processing the power measurement may comprise: using the power measurement and at least one previously received power measurement to calculate a probability that an attenuation of a path from the remote station has changed by more than a defined step size the packet; and wherein generating a power control signal comprises: generating a first power control signal having a value dependent upon whether the probability exceeds a threshold.

A second aspect provides a method comprising: receiving a RSSI value for a packet received from a remote station; converting the RSSI value to a power value; and smoothing the power value based on a plurality of previously received converted RSSI values to generate a power control signal.

The method may further comprise providing the power control signal to a link manager.

A third aspect provides a power control system comprising: means for receiving a RSSI value for a packet received from a remote station; means for converting the RSSI value to a power value; and means for smoothing the power value based on a plurality of previously received converted RSSI values to generate a power control signal.

A fourth aspect provides a power control system comprising: means for receiving a power measurement for a packet received from a remote station; a processing element arranged to process the power measurement using a method which is dependent upon a value of the power measurement and generate a power control signal.

The processing element may comprise: a filter arranged to generate the power control signal; and a decision element arranged to: calculate a difference between the power measurement and a value of the power control signal; reject the measurement and increment a counter if the difference exceeds a first threshold and a counter does not exceed a second threshold; reset the counter if the difference does not exceed the first threshold; and input the measurement to the filter if the difference does not exceed the first threshold or if the difference exceeds the first threshold and the counter exceeds the second threshold.

The processing element may comprise: a filter arranged to generate the power control signal; and a decision element arranged to: calculate a difference between the power measurement and a value of the power control signal; clip the measurement and increment a counter if the difference exceeds a first threshold and a counter does not exceed a second threshold; reset the counter if the difference does not exceed the first threshold; and input the measurement to the filter.

The processing element may comprise: a first filter arranged to generate the power control signal, having a first time constant; a second filter arranged to generate the power control signal, having a second time constant, wherein the first time constant is larger than the second time constant; and a comparison element arranged to: input the measurement to the first filter if the power measurement is larger than a value of the power control signal; and input the measurement to the second filter if the power measurement is not larger than a value of the power control signal.

The first and second filter may comprise a filter having a variable time constant.

The processing element may comprise: a first filter arranged to generate the power control signal, having a first time constant; a second filter arranged to generate the power control signal, having a second time constant, wherein the first time constant is larger than the second time constant; and a decision element arranged to: calculate a difference between the power measurement and a value of the power control signal; input the measurement to the second filter and increment a counter if the difference exceeds a first threshold and the counter does not exceed a second threshold; reset the counter if the difference does not exceed the first threshold; and input the measurement to the first filter if the difference does not exceed the first threshold or if the counter exceeds the second threshold.

The processing element may comprise: at least one filter arranged to generate the power control signal; and a decision element arranged to: determine a measurement interval between the power measurement and a previously received power measurement; and input the power measurement to a filter having a filter response selected according to the measurement interval.

The at least one filter may comprise one of: a filter having a variable filter response and a plurality of filters, wherein each of the plurality of filters has a different filter response.

The processing element may comprise: a filter arranged to generate the power control signal; and a decision element arranged to use the power measurement and at least one previously received power measurement to calculate a probability that an attenuation of a path from the remote station has changed by more than a defined step size the packet, and wherein the power control signal comprises a value dependent upon whether the probability exceeds a threshold.

A fifth aspect provides a wireless device comprising a power control system as described above.

A sixth aspect provides a system comprising at least one wireless device as described above.

Further aspects provides a method of generating a power control signal substantially as described with reference to any of FIGS. 1-7 of the drawings and a power control system substantially as described with reference to any of FIGS. 1-5 of the drawings.

The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 1-5 also comprise schematic diagrams of apparatus which may be used to implement the methods shown in FIGS. 1-7.

Figure 1:
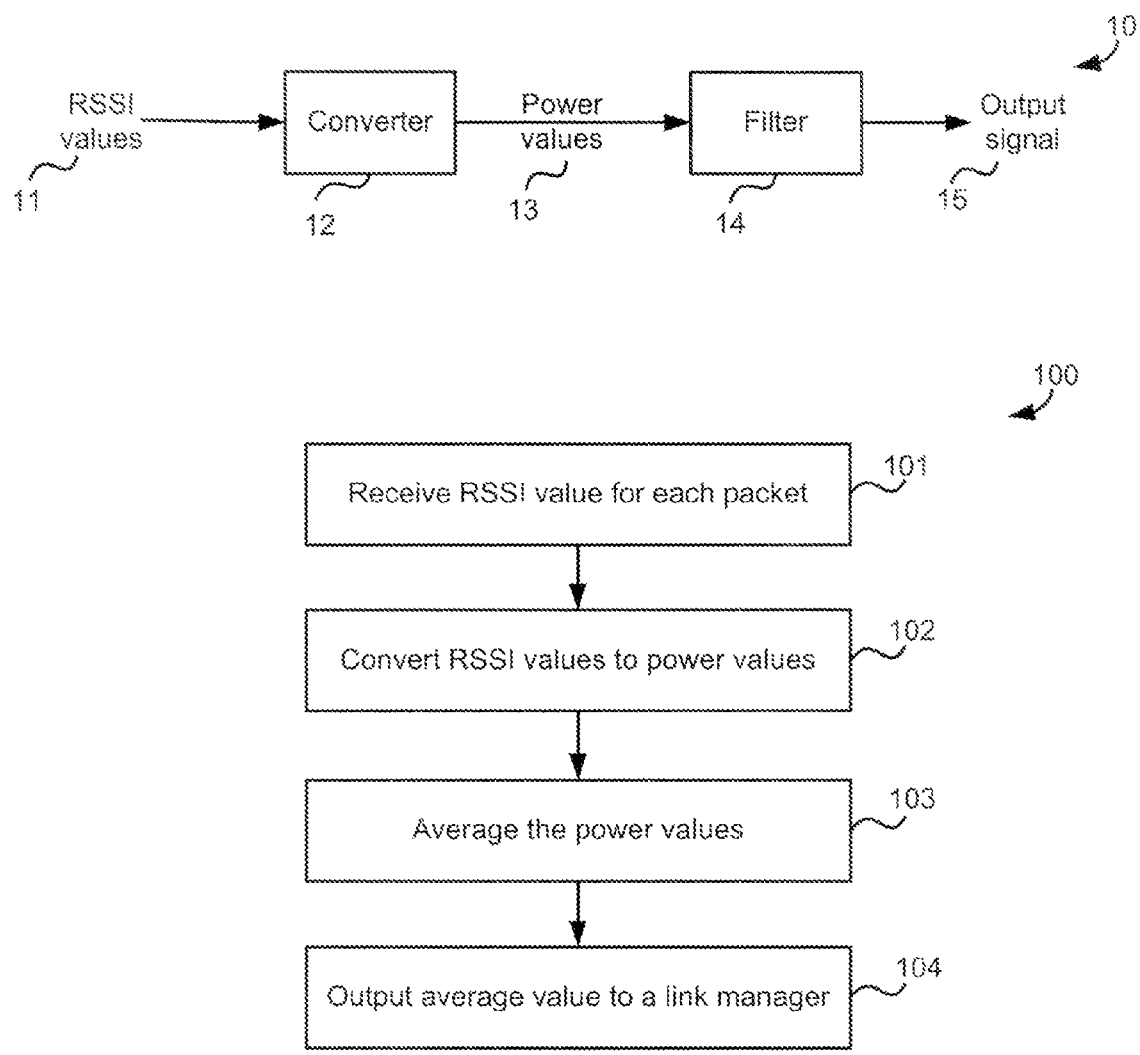
FIGS. 1-7 show flow diagrams of example methods of generating a power control signal which may be used by a link manager, or other element, to determine whether to send power control messages to a remote station.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The power received at a receiving station is affected by many factors, including the transmitted power, the overall attenuation of the path and the frequency used to transmit the signal. As described above, there may be some frequencies at which fading occurs due to destructive interference from multi-path signals (e.g. signals which have been reflected off objects in the environment and therefore travel a different length path between the transmitting and receiving stations). The general form of the relationship between transmitted and received power ($P_t$ and $P_r$ respectively), may be written:

$$P_r = P_t \cdot A \cdot F(f)$$

where A is an overall attenuation of the path due to distance and other frequency independent attenuation and F(f) is fading, which is a function of frequency, f. In order to adjust the transmitted power to compensate for the overall attenuation, the receiving station ideally estimates the value of A, however, the measured values are dependent on both A and F(f). Since each measurement is done at a different, frequency with the radio hopping in a pseudo-random sequence, the measurement varies with time and may be considered 'noisy'.

Use of a filter, as described above, provides a means of smoothing the variation in the measured signal, which is typically a measurement of the logarithm of received power (RSSI). As described above, in existing power control mechanisms, the filter is chosen to be slow in order to that the output value does not decrease significantly if the radios hop onto a frequency (or channel) which is subject to fading. This in turn avoids situations where a link manager in the receiving station sends undesirable power control messages having sampled a falsely low filter output (due to fading). These messages could otherwise result in large fluctuations in the transmitted power. These methods operate satisfactorily where packets are received frequently, however, in situations where packets are received infrequently, problems may arise. For example, in a low power mode of Bluetooth, packets are received infrequently (e.g. the packet rate may be around 100 times lower than in normal operation) and this can result in the filter output moving so slowly (e.g. 100 times slower) that it limits the update rate for the power control. In the typical 1.28 s sniff used on an idle Bluetooth headset, a standard power control mechanism may take tens of seconds to respond to a drop in received signal power caused by an actual increase in attenuation (e.g. when a user places their telephone in their pocket). One approach to address the situation where packets are received infrequently is to adjust the filter per fixed time, rather than per packet. However, this is potentially computationally intensive and if no packets are received in a unit of time, the filter may have no data on which to base any adjustment. This may result in the filter overly compensating for problematic frequencies (i.e. frequencies which are subject to fading) in a similar manner to adjusting the filter on a per packet basis.

FIG. 1 shows a flow diagram 100 of an example method of generating a power control signal (output signal 15) which may be used by a link manager, or other element, to determine whether to send power control messages to a remote station. FIG. 1 also comprises a schematic diagram 10 of apparatus which may be used to implement the method. According to this method, a RSSI value is received for each packet received at the receiving station (block 101) and these RSSI values 11, which are a measurement of the logarithm of received power, are converted (in converter 12) to power values (block 102) before being averaged (block 103) using a filter 14. The resulting output signal 15 may be provided to a link manager or other element in the receiving station which determines whether to send power control messages to the transmitting station (block 104).

The filter 14 may be a discrete exponential filter which is adjusted per packet. The time constant of the filter may be selected to be slow.

By averaging power, rather than the logarithmic RSSI values, a lower weight is placed on hops with weak signal strength, which will include hops to frequencies which are subject to fading, in the averaging process.

Figure 2:
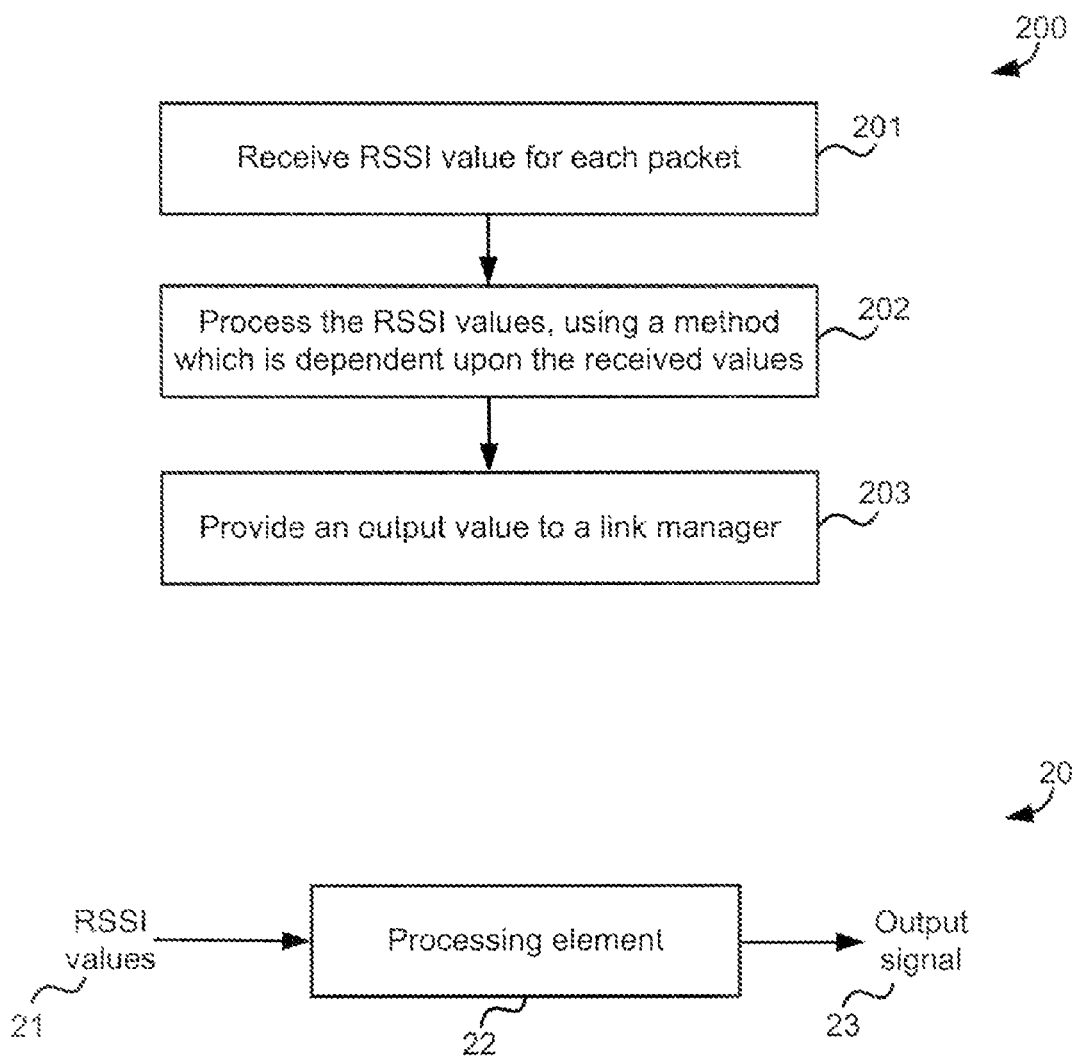

FIG. 2 shows a flow diagram 200 of another method of generating a power control signal (output signal 23) which may be used by a link manager, or other element, to determine whether to send power control messages to a remote station. FIG. 2 also comprises a schematic diagram 20 of apparatus which may be used to implement the method. According to the method shown in FIG. 2, one RSSI value 21 is received for each data packet received (block 201) and the RSSI values are then processed (block 202, element 22) to generate an output signal 23 which may be provided to a link manager (block 203) or other element which determines whether to send a power control signal to a transmitting station based on this output signal. The processing method which is used (in block 202) by the processing element 22 is dependent upon the received RSSI values, and in many implementations, the method used may be dependent upon a difference between the received values, such as the magnitude of the difference in RSSI values, the difference between the RSSI value and the current output value, the sign of the difference (e.g. an increase or decrease in RSSI), a predicted difference in path attenuation calculated from the received RSSI values, a time difference between RSSI values etc. FIGS. 3-7 show more detailed implementations of the method shown in FIG. 2.

Figure 3:
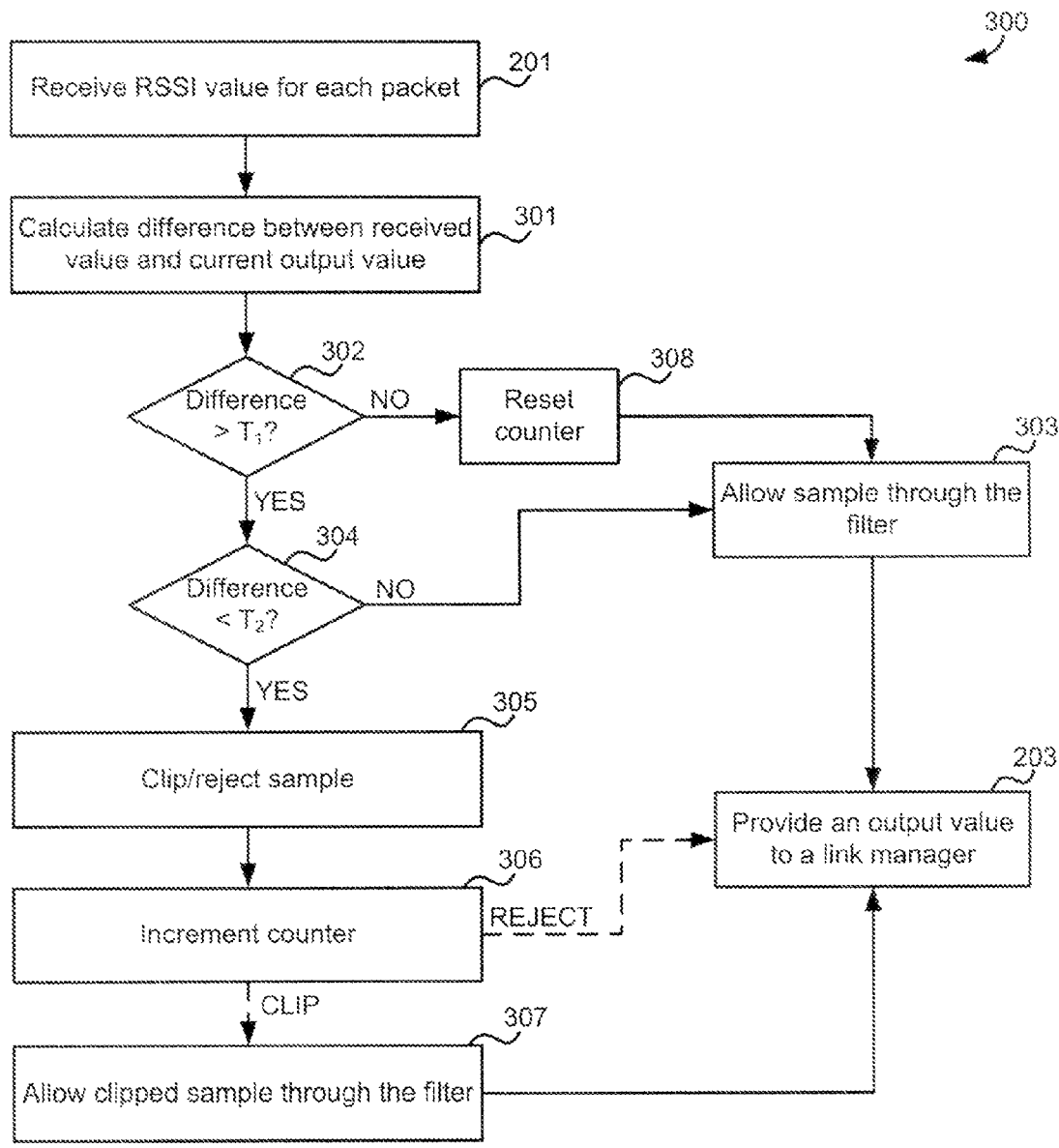
Figure 3:
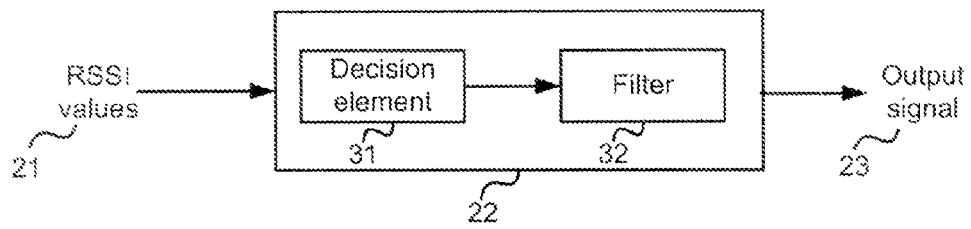

FIG. 3 shows a flow diagram 300 of an example method of generating a power control signal which may be used by a link manager, or other element, to determine whether to send power control messages to a remote station. FIG. 3 also comprises a schematic diagram 30 of apparatus which may be used to implement the method. In this method, if the difference between a received RSSI value and the current output value is too large, the sample (i.e. the received RSSI value) is either clipped or rejected. Where the sample is rejected, the output value remains unchanged, and where the sample is clipped, the clipped sample is allowed through a filter 32 and this may result in a change in output value. Where a number of successive samples are received which are significantly different to the current output value, the decision element 31 (which may be implemented in firmware) will begin allowing such samples through the filter until the input and output samples are within a certain range of each other.

Where successive received samples are significantly lower (or higher) than the current output (average or smoothed) signal, this indicates that the change is likely to be due to frequency independent effect (e.g. a telephone being moved into/out of a pocket or bag) rather than due to fading. It is desirable to compensate for such a change in frequency independent attenuation.

As shown in FIG. 3, the difference between a received RSSI value and the current output value is calculated (block 301) and if this difference does not exceed a threshold $T_1$ ('No' in block 302), the sample is allowed through the filter 32 (block 303). If however, the calculated difference does exceed the threshold ('Yes' in block 302), the received RSSI value will be clipped or rejected (in block 305) unless a maximum number of successive clipped/rejected samples $T_2$ has been reached ('No' in block 304). In this case, the (unclipped) sample is allowed through the filter 32 (block 303).

Where a sample is clipped or rejected (in block 305), a clip/reject counter is incremented by one (block 306) and then the method operates slightly differently dependent on whether clipping or rejection is being used. If the sample is rejected (in block 305), the sample will not be allowed through the filter and the output value (provided in block 203) will be unchanged. It however, clipping is used (in block 305), the clipped sample is allowed through the filter (block 307) and this may result in a change in the output value provided to the link manager or other element (in block 203).

The term 'clipping' is used herein to refer to a process by which the difference between the value of a sample input to the filter and the current output signal value is limited. As a result if the value of the input RSSI is I and the current output signal value is O, the clipped value of 1, where I<O−T$_1$, is given by I$_{clipped}$=O−T$_1$.

In the flow diagram 300 shown in FIG. 3, the clip/reject counter is reset (in block 308) only when the received value and the output value are within a certain range of each other (i.e. where the difference does not exceed the threshold T$_1$). Alternatively, the counter may be reset each time a received value is allowed through the filter (e.g. following block 303).

An example of pseudocode which may be executed on each received packet and which implements clipping in a similar manner to that shown in FIG. 3 is:

```
rssi = hal_rssi( ) # instantaneous RSSI from last reception
fading_clip = filtered_rssi − filter_clip_threshold
    if rssi < fading_clip:
        if filter_clip_count < max_clip_count:
            rssi = fading_clip
            filter_clip_count += 1
    else:
        filter_clip_count = 0
filtered_rssi = filter(rssi, filtered_rssi) # update the filter
```

The method which is implemented in the pseudocode example above only clips where the RSSI value (rssi) is very low and not where the RSSI exhibits a large positive change, compared to the current output signal (filterered_rssi). This is by way of example only and the clipping may be implemented for large positive and/or large negative changes in RSSI.

The maximum number of successive clipped/rejected samples which are permitted (T$_2$ or max_clip_count) may be selected dependent upon a particular implementation and in many examples may a low value, such as a value which is less than five (e.g. 2 or 3). In some examples, the value may be set dependent upon the probability that the transmitting station hops from a channel which subject to fading to an adjacent channel. For example, Bluetooth uses 79 channels in a pseudo-random sequence. If the current channel is experiencing a fade and the fade is W channels wide, then the probability of hopping to another channel in that fade is W/79, the probability of doing is twice is (W/79)$^2$ etc. In order to give an upper bound on the probability that the filter accepts a fade as a real drop in RSSI, the maximum number of successive clipped/rejected samples which are permitted (T$_2$) may be set such that $$\left(\frac{W}{79}\right)^{T_2}$$

is less than the upper bound.

In an implementation such as shown in FIG. 3, the speed of the filter 32 (which may be a discrete exponential filter) may be increased to improve the response time, compared to known systems. The increase in speed may be by several powers of 2 (e.g. by several binary orders of magnitude).

Figure 4:
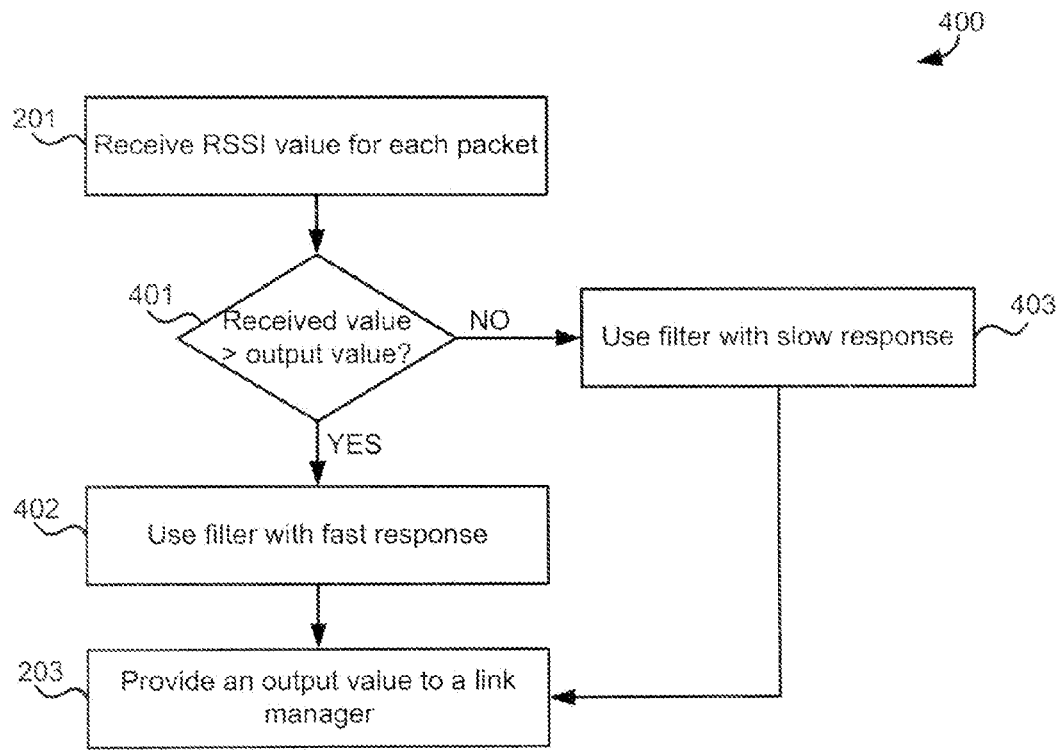
Figure 4:
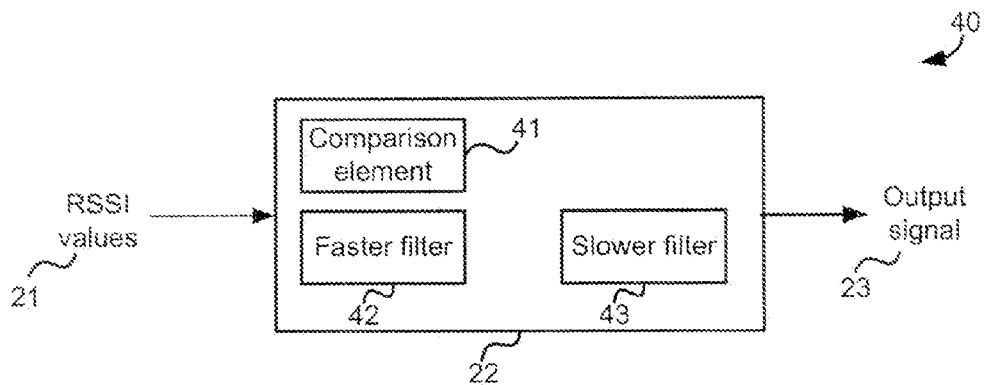

FIG. 4 shows a flow diagram 400 of another example method of generating a power control signal 23 and a schematic diagram 40 of apparatus which may be used to implement the method. According to this method, filters 42, 43 having different response times are used dependent on whether the received value is larger or smaller than the current output value (as determined in comparison element 41), i.e. whether the difference is positive or negative. By using a filter with slower response (block 403), in situations where the received value is less than the current output value ('No' in block 401), the output value does not reduce significantly if the transmitting station hop's onto a frequency which is affected by fading; however, by using a filter with faster response (block 402), where the received value is more than the current output value ('Yes' in block 401), the system can respond more rapidly to reductions in path attenuation (e.g. where a user takes their phone out of their bag or pocket).

In this example, the filters 42, 43, used may be discrete exponential filters and the slower filter 43, may have a response time which is similar to that used in known systems. In another example, a single filter may be used (instead of filters 42, 43) which has a variable response time and the filter response may be adjusted based on the sign of the difference between the received value and the current output value.

Figure 5:
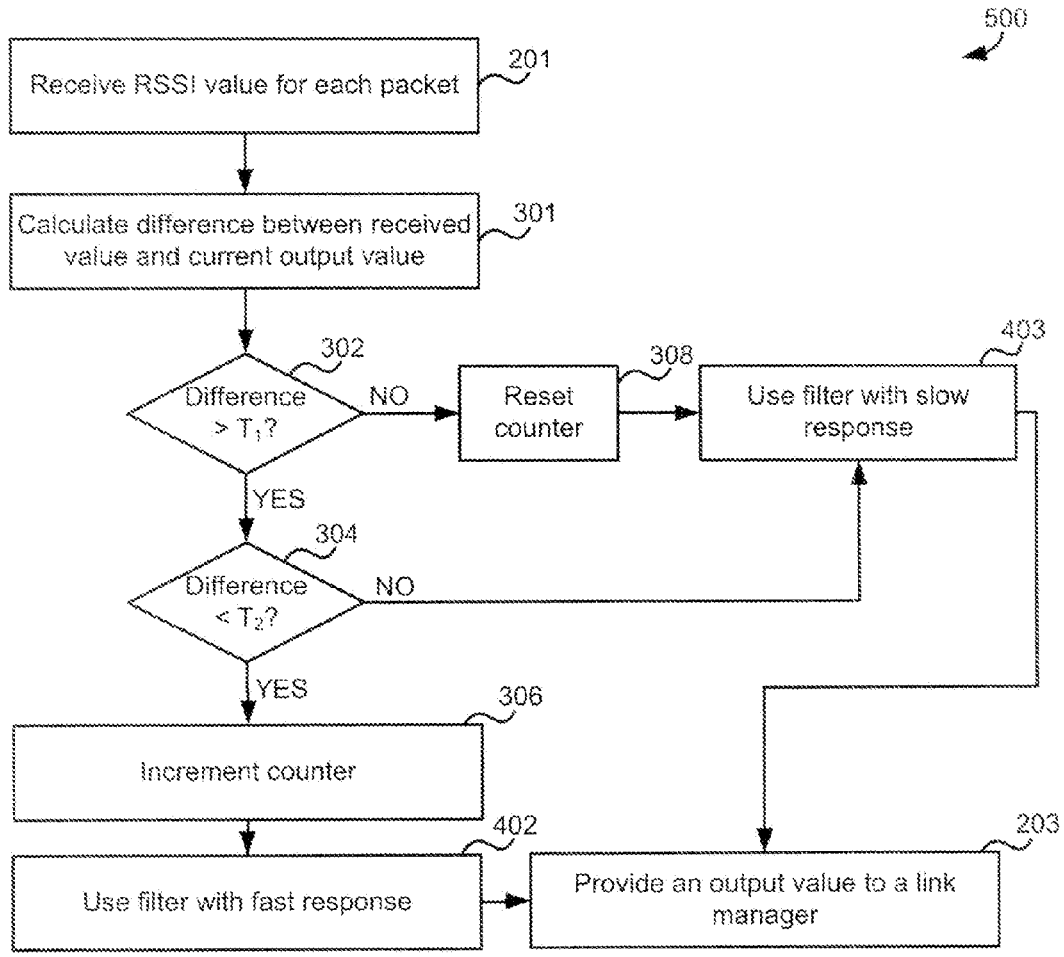
Figure 5:
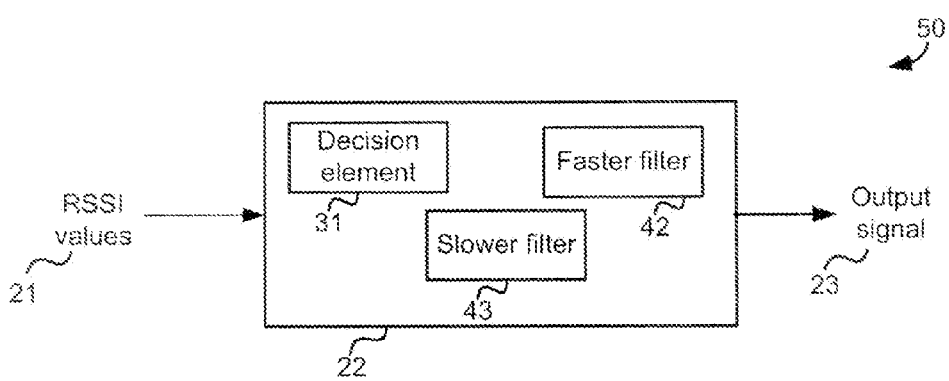

FIG. 5 shows a flow diagram 500 of a further example method of generating a power control signal 23. This method combines the ideas shown in FIGS. 3 and 4 (described above), such that the filter response is varied (or different filters used) dependent upon whether the received RSSI values are similar to the current output value or whether a number of significantly different values have been received in succession. These values may be referred to as 'outliers' or 'outlying values'. FIG. 5 also comprises a schematic diagram 50 of apparatus which may be used to implement the method and which is also a variation of that shown in FIGS. 3 and 4. As shown in FIG. 5, while the received value is close to the current output value (e.g. the difference calculated in block 301 does not exceed a threshold, as determined in block 302), the system operates using a filter with a slow response (block 403, filter 43). This may be considered to be 'normal operation'. However, where a number of outlying values are received in succession ('Yes' in both blocks 302 and 304), a filter with a faster response is used (block 402, filter 42). Where a succession of outlying values are received, this indicates that the drop in power is unlikely to be due to a frequency dependent effect (e.g. fading) but is more likely to be due to a change in path attenuation (A).

As described above, the filters 42, 43, used may be discrete exponential filters and the slower filter 43, may have a response time which is similar to that used in known systems. Alternatively, a single filter may be used which has a variable response time and the filter response may be adjusted based on the determination made by the decision element 31 (in blocks 302 and 304).

Although FIG. 5 shows the use of the same thresholds, T$_1$ and T$_2$, as in FIG. 3, it will be appreciated that the particular values of these thresholds may be selected based on a specific implementation which is used.

Figure 6:
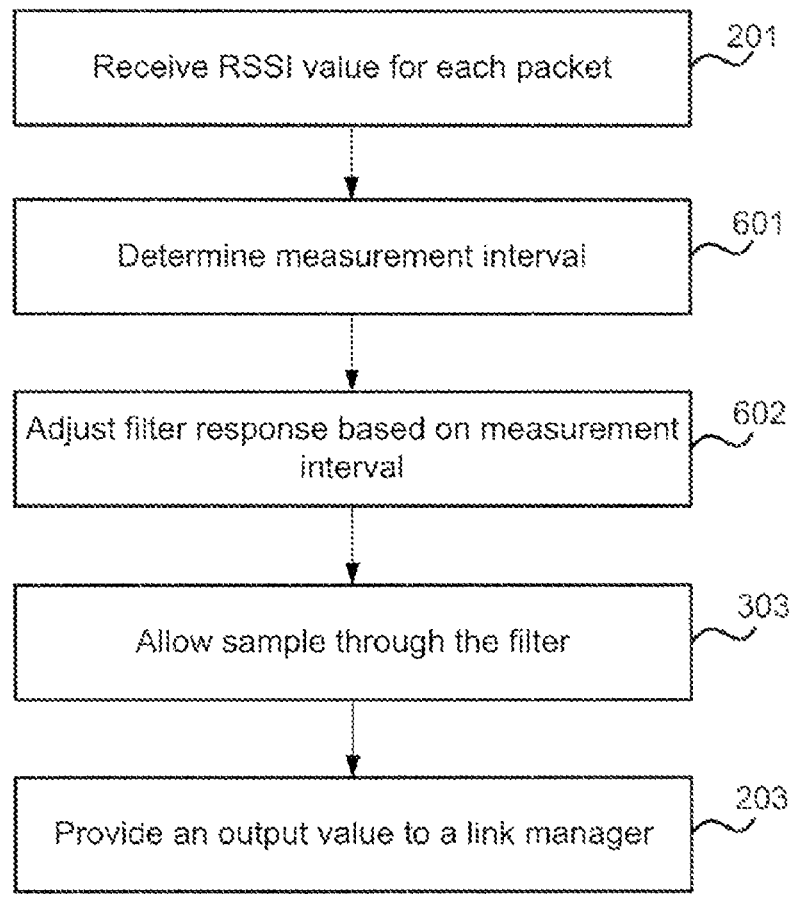

In another example in which the filter response is varied (or multiple filters used with different response times), a fixed relationship between response rate and measurement interval may be defined, and such a method is shown in FIG. 6. As shown, the measurement interval (or time difference) between two RSSI values received in succession (and corresponding to two data packets received in succession) is determined (block 601) and the response of the filter is adjusted based on the determined value and the defined relationship (block 602).

The method shown in FIG. 6 enables a slower filter response rate (or time constant) to be used when packets are received frequently and a faster filter response rate to be used when packets are received infrequently such that smoothing occurs over a fixed number of measurements. However, any relationship between response rate and measurement interval may be used.

In a variation of that shown in FIG. 6, a threshold may be used in combination with two response times (or two filters with different response times), such that if the measurement interval (as determined in block 601) is below a threshold, a first response time is used and if the measurement interval exceeds the threshold, a second response time (or a second filter) is used, in a manner which is analogous to that shown in FIG. 5 (but using different decision criteria, e.g. block 601 instead of blocks 302 and 304). In a further variation, multiple thresholds and multiple filters (or one or more filters with variable response time) may be used.

Figure 7:
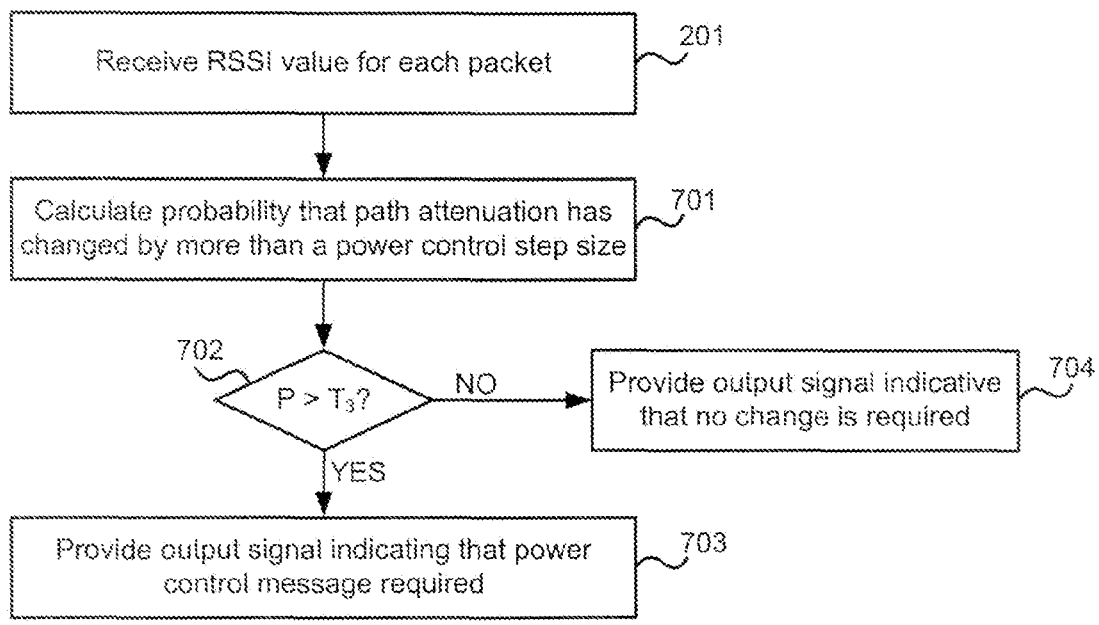

FIG. 7 shows a flow diagram 700 of a further example method of generating a power control signal which may be used by a link manager, or other element, to determine whether to send power control messages to a remote station. According to this method, each time a new RSSI value is received (in block 201), the probability that the path attenuation (and other non-frequency dependent attenuation), A, has changed by more than a power control step size is determined (block 701). The size of the power control step may be selected for a particular application. The probability, p, that A has changed by more than this amount may be calculated (or estimated) using the general expression given above ($P_r = P_t \cdot A \cdot F(f)$) and Bayes theorem using the observed data (e.g. the historical RSSI data) or any other method may be used. This calculation may require prior knowledge of the fading properties of the channel and a likely rate of change of A. The fading properties of a typical channel and an upper limit on the likely rate of change of A may be used instead of actual information for the particular channel being used for any measurement.

If the calculated probability, p, exceeds a threshold, $T_3$, ('Yes' in block 702), an output signal may be provided which indicates that a power control message needs to be sent to the transmitting station (block 703). If the calculated probability does not exceed this threshold ('No' in block 702), an output signal may be provided which indicates that no power control message is required (block 704). In an example, the threshold may be set at 50%, such that if the probability that the attenuation has changed by more than the power control step size exceeds 50%, the output signal indicates that a power control message should be sent to the transmitting station.

Whilst the above description of FIG. 7 refers to an output signal that indicates to a link manager (or other element) that a power control signal needs to be or should be sent to the transmitting station, it will be appreciated that the link manager may apply additional logic to interpret the output signal (which is an input signal for the link manager) and make a determination of whether to send a power control message to the transmitting station.

The methods described above with reference to FIGS. 2-7 distinguish between narrow fades around a particular frequency and genuine increases in path loss, which may, for example, be caused by the remote device (the transmitting station) moving further away or being placed in a bag or pocket. As a result the methods provide improved power control response when packets are received infrequently.

The methods also only require a small amount of state information (if any) to be maintained in memory, e.g. the value of the counter in the methods shown in FIGS. 3 and 5. This may be beneficial where the amount of memory is limited, where the method is implemented for every packet and/or where the state is stored for multiple links in parallel (e.g. for each Bluetooth connection, where there may be up to a maximum of seven links to different remote devices).

Any reference to a transmitting/receiving station herein relates only to the transmitting or receiving station for a particular packet for which the RSSI is determined and processed. It will be appreciated that the transfer of data may be bidirectional and therefore any particular device may be both a transmitting station and a receiving station for different packets. As a result a device may be sending power control messages to a remote station and also receiving power control messages from the same or a different remote station. The methods may also be implemented irrespective of whether the device is acting as a slave or master in a relationship with a remote device.

Although the methods are described herein as being implemented for every packet received, this is by way of example only and the method need not be implemented for every packet received and the process may be variable such that in some instances the methods are implemented for each packet received and in some instances the methods are implemented for every $n^{th}$ packet (where n is an integer).

The description above refers to the method receiving one RSSI value (one sample) for each packet received at the receiving station. It will be appreciated that this is by way of example only and in some instances a RSSI value may be received for every $m^{th}$ packet (where m is an integer).

In the methods above, the filters used are described as being discrete exponential filters. This is by way of example only and any suitable infinite or finite impulse response filter may alternatively be used. Furthermore, the methods described herein are not limited to any particular filter type, design or technology.

The packets being sent from the transmitting station to the receiving station may be sent using a Bluetooth link or any other wireless protocol may be used. In an example, the methods may be applied to any protocol which comprises a power control mechanism (which may be different to that described herein) and with a mode of operation in which there is intermittent packet exchange between a transmitting and a receiving station. Similarly, the power control messages which are triggered by the output values calculated using one of the methods described herein, may be communicated to the transmitting station over a Bluetooth link or in any other manner.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method comprising:
   receiving a power measurement for a packet received from a remote station via a wireless link;
   processing the power measurement using a method which is dependent upon a value of the power measurement; and
   generating a power control signal, wherein processing the power measurement comprises:
   calculating a difference between the power measurement and a value of the power control signal; and
   if the difference exceeds a first threshold and a counter does not exceed a second threshold, the method further comprises one of:
   rejecting the measurement and incrementing the counter; and
   clipping the measurement, incrementing the counter and inputting the measurement to a filter; and
   incrementing the counter and inputting the measurement to a filter with a second time constant;
      and wherein if the method comprises incrementing the counter and inputting the measurement to a filter with a second time constant, the method yet further comprises:
   if the difference does not exceed the first threshold, resetting the counter and inputting the measurement to a filter with a first time constant; and if the difference exceeds the first threshold and the counter exceeds the second threshold, inputting the measurement to the filter with the first time constant, wherein the first time constant is larger than the second time constant.

2. The method according to claim 1, comprising one of rejecting the measurement and incrementing the counter; and clipping the measurement, incrementing the counter and inputting the measurement to a filter; the method further comprising:
   if the difference does not exceed the first threshold, resetting the counter and inputting the measurement to a filter; and
   if the difference exceeds the first threshold and the counter exceeds the second threshold, inputting the measurement to a filter.

3. A method comprising:
   receiving a power measurement for a packet received from a remote station via a wireless link;
   processing the power measurement using a method which is dependent upon a value of the power measurement; and
   generating a power control signal, wherein processing the power measurement comprises:
   if the power measurement is larger than a value of the power control signal, inputting the measurement to a filter with a first time constant; and
   if the power measurement is not larger than a value of the power control signal, inputting the measurement to a filter with a second time constant,
   wherein the first time constant is larger than the second time constant.

4. A method comprising:
   receiving a power measurement for a packet received from a remote station via a wireless link;
   processing the power measurement using a method which is dependent upon a value of the power measurement; and
   generating a power control signal, wherein processing the power measurement comprises:
   using the power measurement and at least one previously received power measurement to calculate a probability that an attenuation of a path from the remote station has changed by more than a defined step size the packet; and
   wherein generating a power control signal comprises:
   generating a first power control signal having a value dependent upon whether the probability exceeds a threshold.

5. A power control system comprising:
   means for receiving a power measurement for a packet received from a remote station via a wireless link;
   a processing element arranged to process the power measurement using a method which is dependent upon a value of the power measurement and generate a power control signal, wherein the processing element comprises:
   a filter arranged to generate the power control signal; and
   a decision element selected from a first decision element, a second decision element and a third decision element,
   wherein the first decision element is arranged to:
   calculate a difference between the power measurement and a value of the power control signal;
   reject the measurement and increment a counter if the difference exceeds a first threshold and a counter does not exceed a second threshold;
   reset the counter if the difference does not exceed the first threshold; and
   input the measurement to the filter if the difference does not exceed the first threshold or if the difference exceeds the first threshold and the counter exceeds the second threshold,
   the second decision element is arranged to:
   calculate a difference between the power measurement and a value of the power control signal;
   clip the measurement and increment a counter if the difference exceeds a first threshold and a counter does not exceed a second threshold;
   reset the counter if the difference does not exceed the first threshold; and
   input the measurement to the filter; and
   the third decision element is arranged to:
   use the power measurement and at least one previously received power measurement to calculate a probability that an attenuation of a path from the remote station has changed by more than a defined step size the packet,
   and wherein, if the decision element is the third decision element, the power control signal comprises a value dependent upon whether the probability exceeds a threshold.

6. A power control system comprising:
   means for receiving a power measurement for a packet received from a remote station via a wireless link;
   a processing element arranged to process the power measurement using a method which is dependent upon a value of the power measurement and generate a power control signal, wherein the processing element comprises:
   a first filter arranged to generate the power control signal, having a first time constant;
   a second filter arranged to generate the power control signal, having a second time constant, wherein the first time constant is larger than the second time constant; and
   one of a comparison element and a decision element,
   wherein the comparison element is arranged to:
   input the measurement to the first filter if the power measurement is larger than a value of the power control signal; and input the measurement to the second filter if the power measurement is not larger than a value of the power control signal; and wherein the decision element is arranged to:

calculate a difference between the power measurement and a value of the power control signal;

input the measurement to the second filter and increment a counter if the difference exceeds a first threshold and the counter does not exceed a second threshold;

reset the counter if the difference does not exceed the first threshold; and input the measurement to the first filter if the difference does not exceed the first threshold or if the counter exceeds the second threshold.

7. The power control system according to claim 6, comprising the comparison element and wherein the first and second filter comprise a filter having a variable time constant.

* * * * *